United States Patent
Wang et al.

(10) Patent No.: US 9,148,608 B2
(45) Date of Patent: Sep. 29, 2015

(54) VIDEO ENTERTAINMENT SYSTEM

(71) Applicant: Wistron Corporation, New Taipei (TW)

(72) Inventors: Chun-Chieh Wang, New Taipei (TW); Po-Chao Chang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/949,201

(22) Filed: Jul. 23, 2013

(65) Prior Publication Data

US 2014/0098298 A1    Apr. 10, 2014

(30) Foreign Application Priority Data

Oct. 5, 2012    (TW) .............................. 101136935 A

(51) Int. Cl.
*H04N 21/422* (2011.01)
*H04N 5/38* (2006.01)
*H04N 5/44* (2011.01)
*H04N 21/41* (2011.01)
*H04N 21/4363* (2011.01)

(52) U.S. Cl.
CPC ............... *H04N 5/38* (2013.01); *H04N 5/4403* (2013.01); *H04N 21/4126* (2013.01); *H04N 21/4222* (2013.01); *H04N 21/43637* (2013.01); *H04N 2005/4425* (2013.01)

(58) Field of Classification Search
CPC .......... H04N 21/4126; H04N 21/4222; H04N 21/42204; H04N 21/436; H04N 21/422
USPC ....................................................... 725/80, 81
See application file for complete search history.

(56) References Cited

U.S. PATENT DOCUMENTS

| | | | | |
|---|---|---|---|---|
| 2003/0071117 | A1* | 4/2003 | Meade, II | 235/382.5 |
| 2006/0090122 | A1* | 4/2006 | Pyhalammi et al. | 715/500.1 |
| 2007/0250900 | A1* | 10/2007 | Marcuvitz | 725/141 |
| 2009/0288132 | A1* | 11/2009 | Hegde | 725/141 |

FOREIGN PATENT DOCUMENTS

TW    M426820    4/2012

OTHER PUBLICATIONS

Office action mailed on Jul. 30, 2014 for the Taiwan application No. 101136935, filing date: Oct. 5, 2012, p. 1 line 13-14, p. 2 line 1-9 and p. 3 line 7-8.

* cited by examiner

*Primary Examiner* — Benjamin R Bruckart
*Assistant Examiner* — Tien M Nguyen
(74) *Attorney, Agent, or Firm* — Winston Hsu; Scott Margo

(57) ABSTRACT

A video entertainment system includes a master handset electronic device for generating a first control signal, receiving a second control signal, and processing the first control signal and the second control signal, to generate and transmit a video data; and a slave handset electronic device for generating and transmitting a second control signal to the master handset electronic device.

12 Claims, 5 Drawing Sheets

VIDEO ENTERTAINMENT SYSTEM

BACKGROUND OF THE INVENTION

1. Field of the Invention

The present invention relates to a video entertainment system, and more particularly, to a video entertainment system capable of simultaneously providing complete display images to multiple participants from different sights in a same region, to enhance entertainment experience.

2. Description of the Prior Art

With the progression of technology, small video entertainment device such as hand-held video games, digital music players, etc., have been replaced by portable electronic devices (e.g. smart phones or PDAs, etc.), and the video entertainment market of portable electronic devices is still expending rapidly. Furthermore, portable electronic devices can transmit video data to display devices with larger monitors, to enhance entertainment experience.

Please refer to FIG. 1, which is a schematic diagram of a conventional video entertainment system 10. The conventional video entertainment system 10 includes a handset electronic device 100 and a display device 110. The handset electronic device 100 transmits video data to the display device 110 through wireless local network such as wireless fidelity (WiFi), such that users can watch larger display images, to raise entertainment quality. However, the conventional entertainment system 10 only includes a single handset electronic device, which is suitable to a single user. If there are more participants, the participants need to use the entertainment system 10 in turn, which reduces entertainment experience.

SUMMARY OF THE INVENTION

It is therefore an objective of the present invention to provide a video entertainment system capable of providing complete display images to multiple participants from different sights in a same region respectively and simultaneously, to enhance entertainment experience.

The present invention discloses a video entertainment system. The video entertainment system comprises a master handset electronic device, for generating a first control signal, receiving at least one second control signal, and processing the first control signal and the at least one second control signal, to generate and transmit a video data; and at least one slave handset electronic device, for generating and transmitting the at least one second control signal to the master handset electronic device.

The present invention further discloses a method for a video entertainment system. The video entertainment system comprises a master handset electronic device and at least one slave handset electronic device. The method comprises the master handset electronic device generating a first control signal; the at least one slave handset electronic device generating at least one second control signal; the master handset electronic device receiving the at least one second control signal; the master handset electronic device processing the first control signal and the at least one second control signal; and the master handset electronic device generating and transmitting a video data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
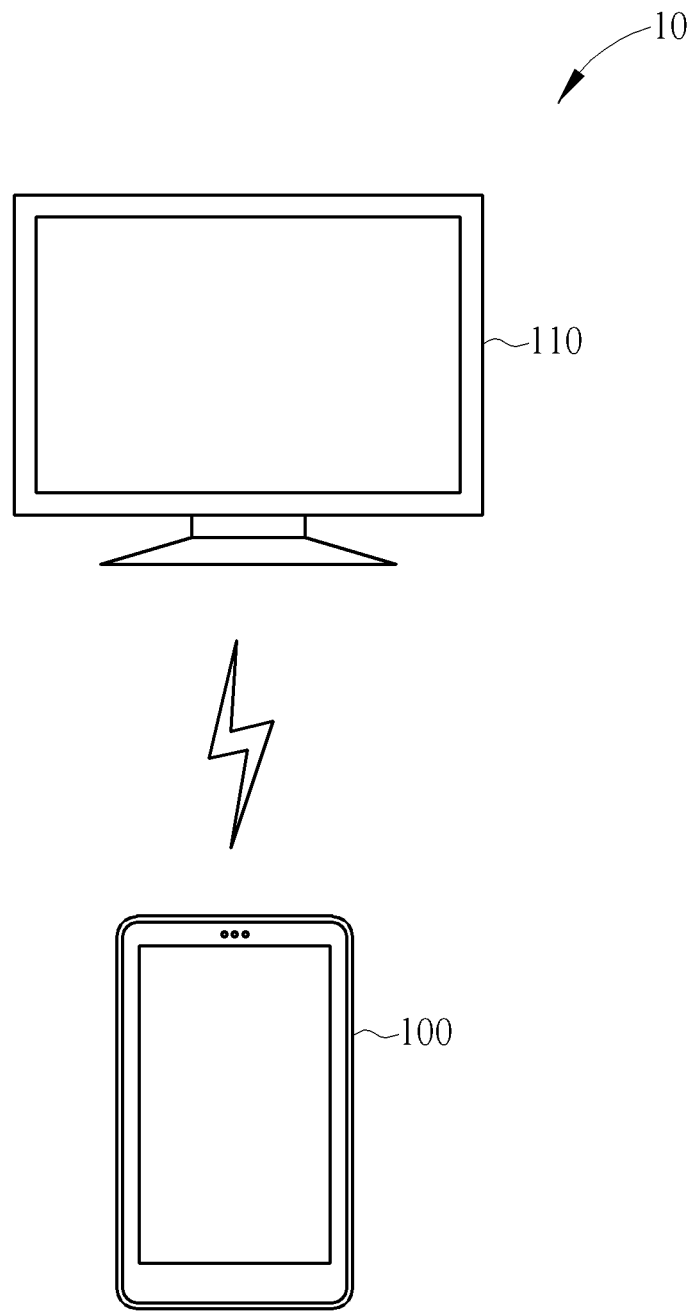
FIG. 1 is a schematic diagram of a conventional video entertainment system.
Figure 2:
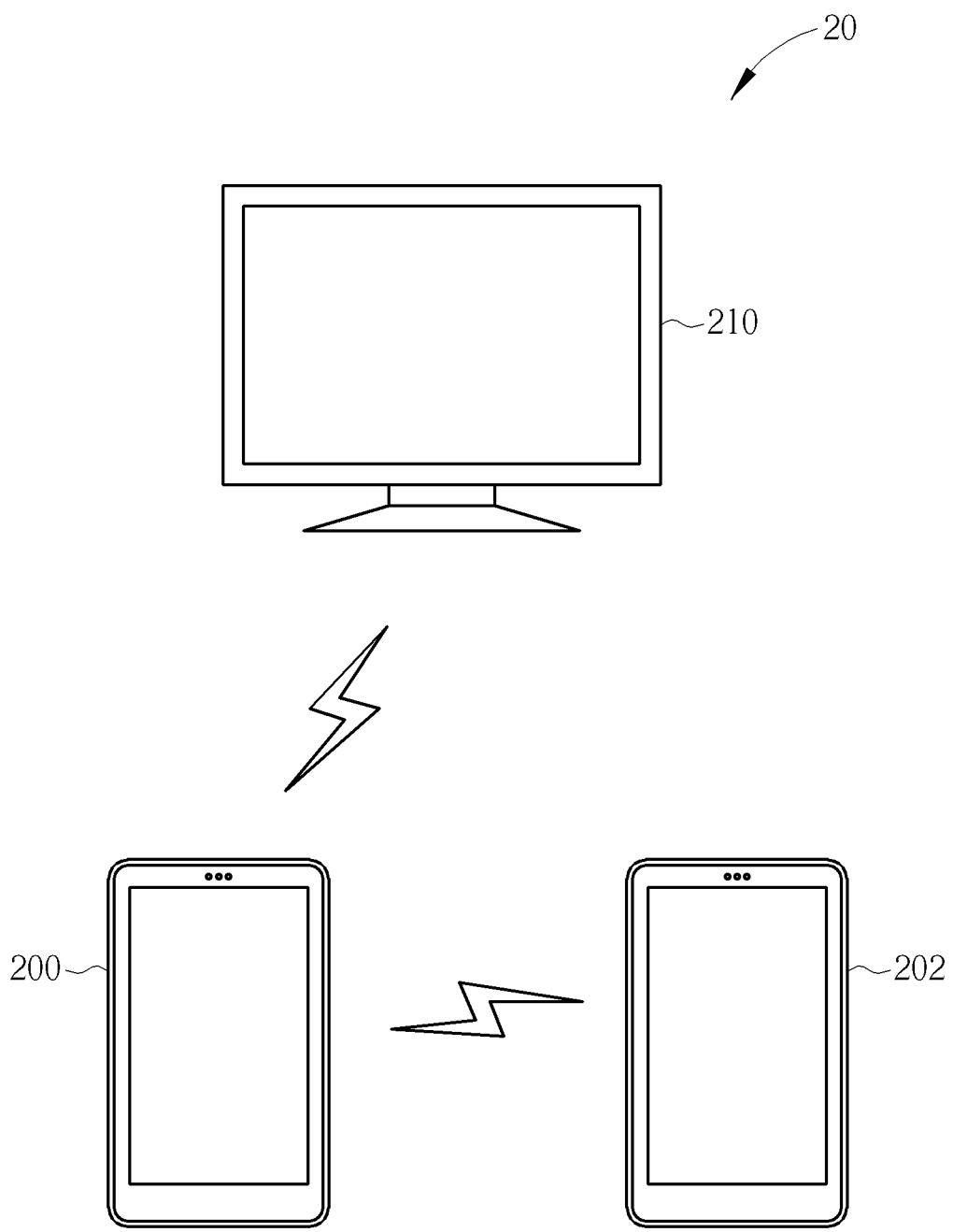
FIG. 2 is a schematic diagram of a video entertainment system according to an embodiment of the present invention.

Please refer to FIG. 2. FIG. 2 is a schematic diagram of a video entertainment system 20 according to an embodiment of the present invention. The entertainment system 20 comprises handset electronic devices 200, 202 and a display device 210. The handset electronic device 200 represents a master handset electronic device with functions of server, and is capable of being connected with a slave handset electronic device (i.e. handset electronic device 202) via wireless fidelity (WiFi) or bluetooth, and transmitting video data to the display device 210. The handset electronic device 200 connects to the display device 210 through WiFi, but is not limited thereto. The handset electronic device 202 represents the slave handset electronic device with functions of client, and is capable of transmitting a control signal to the master handset electronic device (i.e. the handset electronic device 200). The video entertainment system 20 may comprise more than one slave handset electronic devices, but FIG. 2 shows only one slave handset electronic device as an example for simplicity.

Figure 3:
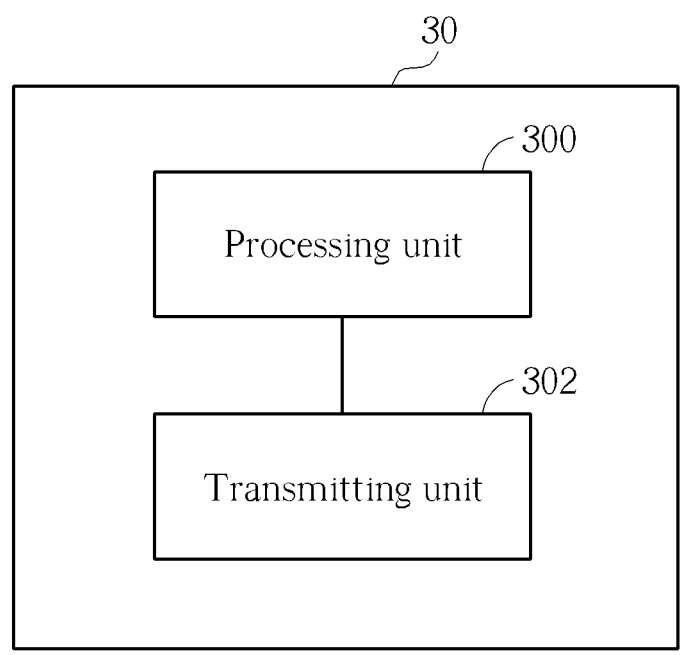
FIG. 3 is a schematic diagram of a communication device according to an embodiment of the present invention.

Please refer to FIG. 3. FIG. 3 is a schematic diagram of a communication device 30 according an embodiment of the present invention. The communication device 30 can be the handset electronic device 200 or 202 of the video entertainment system 20, and comprises a processing unit 300 and a transmitting unit 302.

In detail, in the handset electronic device 202, the processing unit 300 is utilized for generating a control signal, and the transmitting unit 302 is responsible to transmit the control signal generated by the processing unit 300 to the handset electronic device 200 through wireless local area network or bluetooth. In the handset electronic device 200, the processing unit 300 is utilized for generating a control signal and processing a control signal generated by itself and another control signal transmitted by the handset electronic device 202, to generate video data, and the transmitting unit 302 is responsible to receive the control signal transmitted by the handset electronic device 202 and transmits the video data generated by the processing unit 300 to the display device 210.

The display device 210 can be a multi-view display device, such that all users can watch different display images. For example, users A and B use the video entertainment system 20 simultaneously, wherein the user A operates the handset electronic device 200 and the user B operates the handset electronic device 202. The users A and B are in different locations corresponding to the display device 210, such that the users A and B can watch different display images because of characteristic of the multi-view display device. However, depending on different types of multi-view display devices, the users A and B may or may not be required to wear special glasses for watching multi-view effect. The display principle of the multi-view device is not a key issue of the present invention, and will not be elaborated here.

Figure 4A:
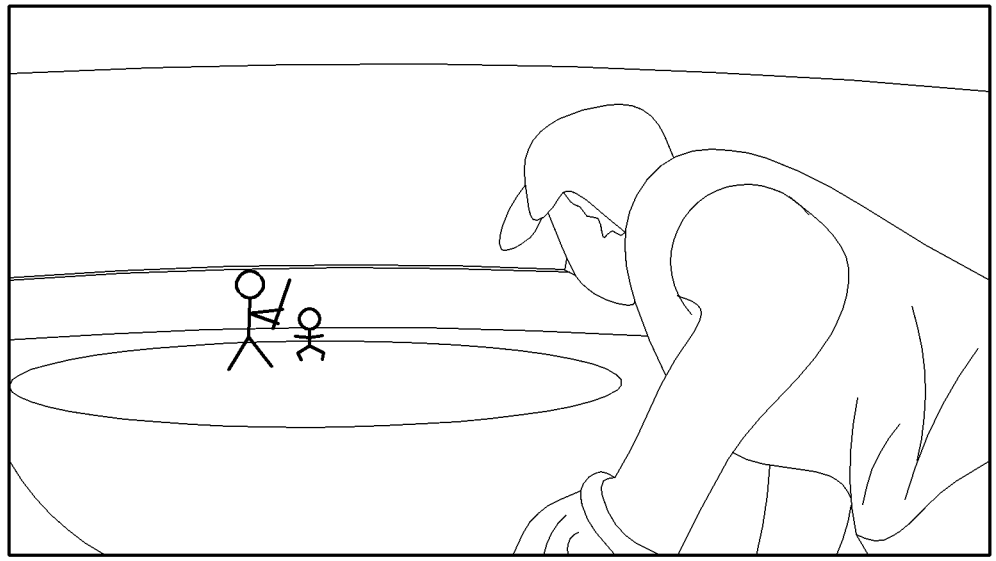
FIG. 4A is a schematic diagram of a display image displaying by the display device in FIG. 2 for a handset electronic device.
Figure 4B:
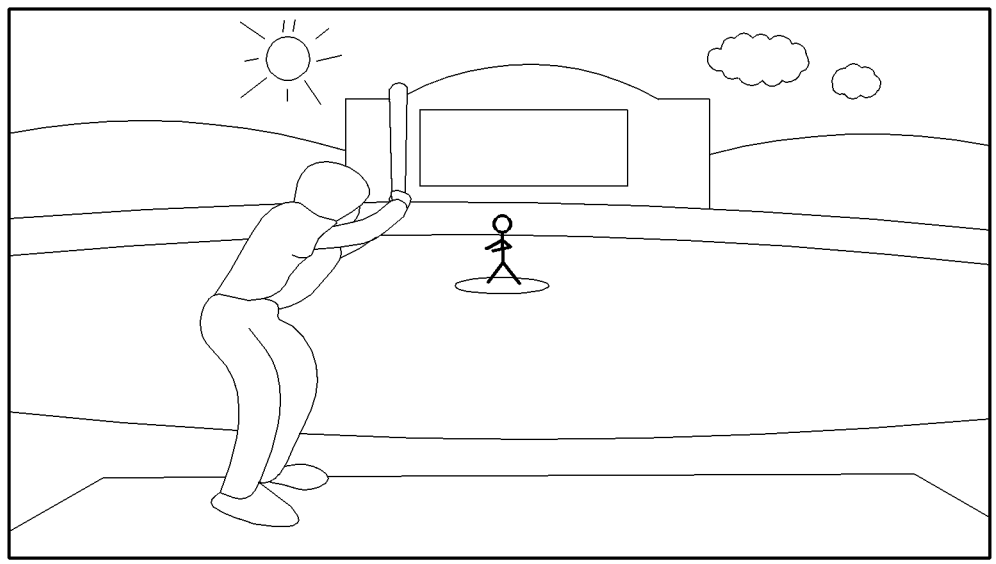
FIG. 4B is a schematic diagram of a display image displaying by the display device in FIG. 2 for another handset electronic device.

Please refer to FIGS. 4A and 4B. FIGS. 4A and 4B are schematic diagrams of display images of the display device 210 corresponding to the handset electronic device 200 and the handset electronic device 202 in FIG. 2 respectively. As can be seen in FIGS. 4a and 4B, the users A and B can watch complete images from different locations and directions respectively, to enhance entertainment experience.

Figure 5:
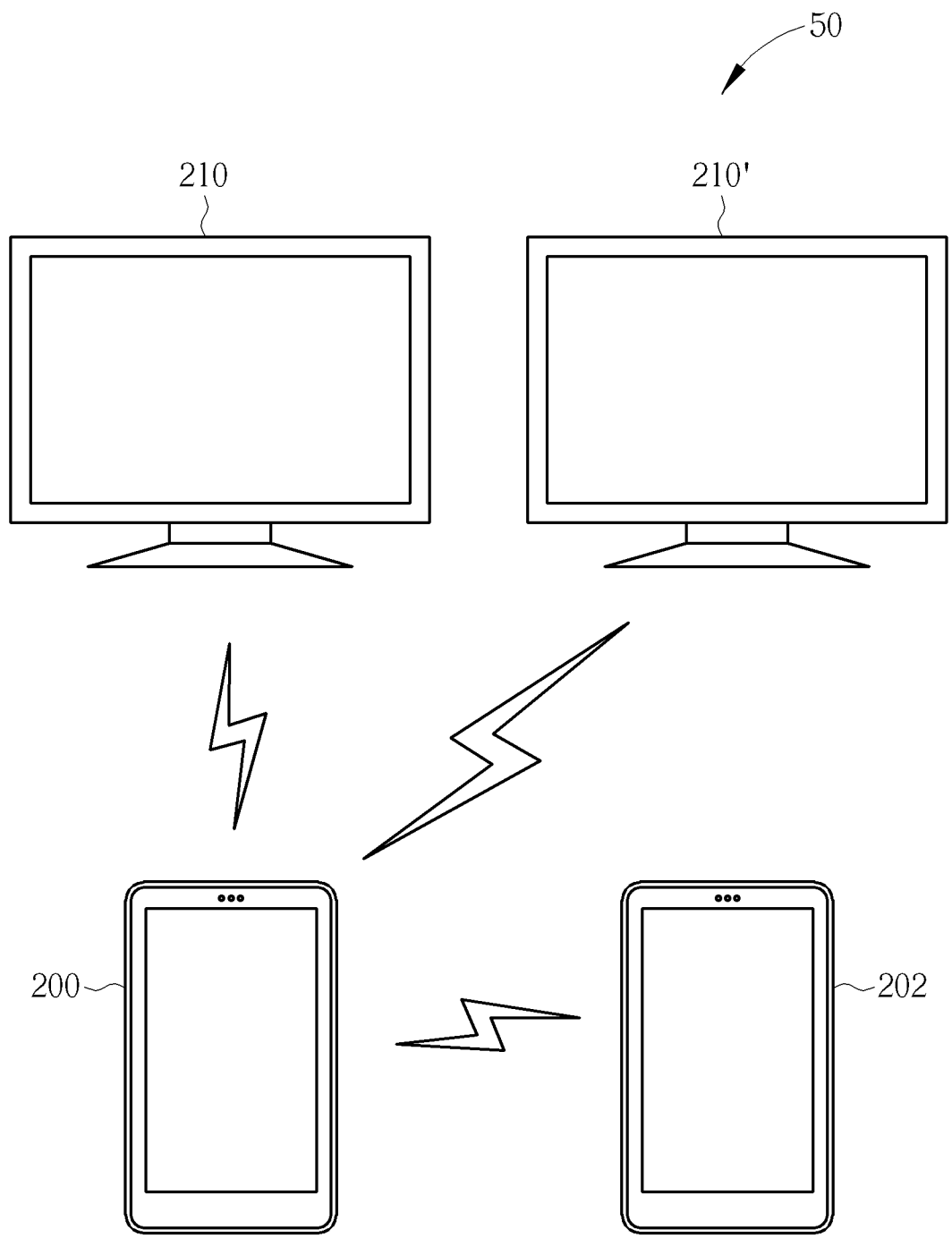
FIG. 5 is a schematic diagram of a video entertainment system according to an embodiment of the present invention.

Please note that, the present invention is not limited to one single display device for displaying multiple display images. Please refer to FIG. 5. FIG. 5 is a schematic diagram of a video entertainment system 50 according to an embodiment of the present invention. Comparing to the video entertainment system 20 shown in FIG. 2, the video entertainment system 50 shown in FIG. 5 further adds another display device 210' (i.e. the video entertainment system 50 comprises two display devices 210). Under such a condition, the handset electronic device 200 transmits two video data to the display devices 210 and 210', wherein video data corresponding to the handset electronic device 200 is transmitted to the display device 210 watched by user A, and video data corresponding to the handset electronic device 202 is transmitted to the display device 210' watched by user B. In FIG. 5, the display devices 210 and 210' can be general display devices with function of receiving video data.

Moreover, in the video entertainment systems of the present invention, any of handset electronic devices can be taken as a master handset electronic device, and other handset electronic devices become slave handset electronic devices accordingly.

In a conventional entertainment system, only one user can operate one singe handset electronic device, and other users in the same region cannot participate in the same time, such that the conventional entertainment system needs to be used in turn and reduces entertainment experience. Comparing to the conventional entertainment system, the present invention provides a video entertainment system and the method thereof to allow different users in the same region to operate different handset electronic devices respectively and participate video entertainment together, to enhance entertainment experience.

In sum, the video entertainment system and the method of the present invention allow users in the same region to participate in video entertainment together, and provide complete display images for users from different sights simultaneously, so as to enhance entertainment experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video entertainment system, comprising:
   a master handset electronic device, for generating a first control signal, receiving at least one second control signal, and processing the first control signal and the at least one second control signal, to generate and transmit a video data;
   at least one slave handset electronic device, for actively generating, transmitting the at least one second control signal to the master handset electronic device without being controlled by the master handset electronic device, and not transmitting the at least one second control signal to a display device; and
   at least one display device, for displaying a plurality of display images according to the video data;
   wherein each of the plurality of display images is corresponding to the master handset electronic device and one of the at least one slave handset electronic device respectively;
   wherein the first control signal is generated by the master handset electronic device according to operations of a master user, and the at least one second control signal is generated by the at least one slave handset electronic device according to operations of at least one user different from the master user,
   wherein the first control signal and the at least one second control signal control operations of the plurality of display images displayed according to the video data.

2. The video entertainment system of claim 1, wherein the master handset electronic device comprises:
   a processing unit, for generating the first control signal and processing the first control signal and the at least one second control signal, to generate a video data; and
   a transmitting unit, for receiving the at least one second control signal and transmitting the video data.

3. The video entertainment system of claim 1, wherein each of the at least one slave handset electronic device comprises:
   a processing unit, for generating a second control signal of the at least one second control signal; and
   a transmitting unit, for transmitting the second control signal to the master handset electronic device.

4. The video entertainment system of claim 1, wherein the at least one display device is a multi-view display device.

5. The video entertainment system of claim 1, wherein the master handset electronic device transmits the video data to the at least one display device through a wireless fidelity connection.

6. The video entertainment system of claim 1, wherein the at least one slave handset electronic device transmits the at least one second control signal to the master handset electronic device through a wireless fidelity connection.

7. The video entertainment system of claim 1, wherein the at least one slave handset electronic device transmits the at least one second control signal to the master handset electronic device through a bluetooth connection.

8. A method for a video entertainment system, wherein the video entertainment system comprises a master handset electronic device and at least one slave handset electronic device, the method comprising:
   the master handset electronic device generating a first control signal;
   the at least one slave handset electronic device actively generating at least one second control signal without being controlled by the master handset electronic device, the slave handset electronic device not transmitting the at least one second control signal to a display device;
   the master handset electronic device receiving the at least one second control signal;
   the master handset electronic device processing the first control signal and the at least one second control signal; and
   the master handset electronic device generating and transmitting a video data to at least one display device, to display a plurality of display images, wherein each of the plurality of display images is corresponding to the master handset electronic device and one of the at least one slave handset electronic device respectively;

wherein the first control signal is generated by the master handset electronic device according to operations of a master user, and the at least one second control signal is generated by the at least one slave handset electronic device according to operations of at least one user different from the master user, wherein the first control signal and the at least one second control signal control operations of the plurality of display images displayed according to the video data.

9. The method of claim 8, wherein the at least one display device is a multi-view display device.

10. The method of claim 8, wherein the master handset electronic device transmits the video data to the at least one display device through a wireless fidelity connection.

11. The method of claim 8, wherein the at least one slave handset electronic device transmits the at least one second control signal to the master handset electronic device through a wireless fidelity connection.

12. The method of claim 8, wherein the at least one slave handset electronic device transmits the at least one second control signal to the master handset electronic device through a bluetooth connection.

* * * * *